(12) United States Patent
Warfield et al.

(10) Patent No.: US 12,182,303 B2
(45) Date of Patent: Dec. 31, 2024

(54) SYSTEM AND METHOD FOR GENERATING SYNTHETIC DATA RECORDS

(71) Applicant: Cognizant Technology Solutions US Corp., Teaneck, NJ (US)

(72) Inventors: Lisa Kay Warfield, Hampton, VA (US); Amanda Jean Dussault, Wake Forrest, NC (US)

(73) Assignee: COGNIZANT TECHNOLOGY SOLUTIONS US CORP., Teaneck, NJ (US)

( * ) Notice: Subject to any disclaimer, the term of this patent is extended or adjusted under 35 U.S.C. 154(b) by 381 days.

(21) Appl. No.: 17/689,020

(22) Filed: Mar. 8, 2022

(65) Prior Publication Data
US 2023/0289467 A1 Sep. 14, 2023

(51) Int. Cl.
*G06F 21/62* (2013.01)
*G06F 18/214* (2023.01)

(52) U.S. Cl.
CPC ...... *G06F 21/6245* (2013.01); *G06F 18/2148* (2023.01)

(58) Field of Classification Search
CPC .......................... G06F 21/6245; G06F 18/2148
USPC .......................................................... 726/26
See application file for complete search history.

(56) References Cited

U.S. PATENT DOCUMENTS

| 8,438,238 | B2 | 5/2013 | Moser |
| 8,612,259 | B2 | 12/2013 | Menschik |
| 2006/0100905 | A1 | 5/2006 | Christen |
| 2023/0013479 | A1* | 1/2023 | Sankaranarayanan ...... G06N 20/00 |

FOREIGN PATENT DOCUMENTS

NL 2012435 A 10/2014

* cited by examiner

*Primary Examiner* — Catherine Thiaw
*Assistant Examiner* — Nega Woldemariam
(74) *Attorney, Agent, or Firm* — CANTOR COLBURN LLP (57) ABSTRACT

The present invention provides for generating high volumes of synthetic data records for testing data processing applications associated with one or more operating fields, such as healthcare without using any confidential Information. In operation, the present invention provides for retrieving a predefined dataset. Further, the present invention provides for extracting data values associated with selected relevant data fields from the retrieved predefined dataset. Furthermore, the present invention provides for defining rules for generating data values of specific data fields out of the selected relevant data fields. Yet further, the present invention provides for evaluating a number of possible data records. Yet further, the present invention provides for generating evaluated number of synthetic data records using a predefined file format based on the extracted data values and the defined rules.

33 Claims, 4 Drawing Sheets

FIGURE 1

| SET ID | SETNAME | RENPROVLASTNAME | RENDPROVFIRSTNAME | RENDPROVMI | RENDPROVTAXID | RENDPROVTYPE |
|---|---|---|---|---|---|---|
| 3 | ProvSet | Lowe | Dara | D | 841591715 | P |
| 3 | ProvSet | Joseph | | F | 841591715 | P |
| 3 | ProvSet | Gibbons | Davis | S | 841607311 | P |
| 3 | ProvSet | Miller | | L | 841608597 | P |
| 3 | ProvSet | Tealdi | Christine | M | 841608597 | P |
| 3 | ProvSet | Siemer | Mark | A | 841609028 | P |
| 3 | ProvSet | Riverside Regional Medical Center | | | 521245746 | P |
| 3 | ProvSet | Sentara Careplex Hospital | | | 541547408 | P |
| 3 | ProvSet | Bon Secours Mary Immaculate Hospital | | | 541201346 | P |
| 3 | ProvSet | Chesapeake Regional Medical Center | | | 541693739 | P |

SYSTEM AND METHOD FOR GENERATING SYNTHETIC DATA RECORDS

FIELD OF THE INVENTION

The present invention relates generally to the field of software development and testing. More particularly, the present invention relates to a system and a method for generating high volumes of synthetic data records, such as healthcare claim data records for testing data processing applications, in particular healthcare data processing applications.

BACKGROUND OF THE INVENTION

In today's era of technology, most of the data processing associated with healthcare, such as recordation of data related to patients, service providers, healthcare payer services, and members of health care payer services in a database; enrollment of members for a service or a healthcare insurance plan, billing, generation of healthcare claims, healthcare claim assessment and processing, and transactions including payments etc. is carried out by software applications.

Like, any other software application, the software applications specific to healthcare data processing require testing during various stages of development and post-development to analyze whether different features and/or configurations within the developed application are performing as expected. For example, a software application including features, such as transaction processing for analyzing healthcare claims and remitting claim payments may be required by a third party payer service, such as a healthcare payer. The required software application may be tested as per the constantly changing unique business requirements of the healthcare payer with high volumes of test cases. However, to ensure that there is no gap in the test-case coverage and the software works as expected, the test cases would require several variations of test data covering unique scenarios. As a result, the required test data would include high volumes of healthcare claim data records including a plurality of data fields with varying data values, such that the claim analysis and remittance features of the software application can be confidently validated and defects in the features, if any can be identified to avoid rework at a later stage. However, unlike any other data processing application, the direct use of production data from a source i.e. the real data maintained in a database is prohibited for use as test data for healthcare specific applications due to confidentiality concerns. Further, if the data from an existing source is manipulated to create new data, the new data is often not masked resulting in a security risk. Moreover, importing high volumes of production data from a source is cumbersome and often requires high processing as wells as interfacing speeds. In order to overcome the above problem, the test data which is realistic and at the same time free from protected health information (PHI) may be manually created. However, manual creation and assembling of high volumes of data is time consuming. Further, the process of creating large volumes of data manually often leads to unwanted modifications in the data, resulting in creation of unusable data.

In light of the above drawbacks, there is a need for a system and a method that can generate synthetic data records in real-time for testing data processing applications. In particular, there is a need for a system and a method that can generate high volumes of synthetic test data records which are realistic and at the same time free from protected health information (PHI). Further, there is a need for a system and a method that can generate high volumes of realistic healthcare claim data records encompassing various scenarios and data fields of a healthcare claim without using confidential Protected Health Information(PHI). Furthermore, there is a need for a system and a method that can generate optimized combinations between data values of healthcare claim data fields to facilitate improved test-case coverage. Yet further, there is a need for a system and a method that can generate on-demand, versatile, scalable, and secure synthetic data records agnostic to healthcare applications. Yet further, there is a need for a system and a method that significantly reduces the time required for generating synthetic test data records. Yet further, there is a need for a system and a method which is economical, and secure.

SUMMARY OF THE INVENTION

In accordance with various embodiments of the present invention, a method for generating synthetic data records is provided. The method is implemented by at least one processor executing program instructions stored in a memory. The method comprises extracting data values associated with selected relevant data fields from a predefined dataset including data fields relevant for generation of a selected type of synthetic data records. The method further comprises defining rules for generating data values of one or more specific data fields out of the selected relevant data fields based on an analysis of the extracted data values or user-inputs or a combination thereof. Further, the method comprises evaluating a number of possible synthetic data records, where combinations between the extracted data values associated with two or more of the selected relevant data fields are computed. The computed combinations is the number of possible data records. Yet further, the method comprises generating the evaluated number of synthetic data records based on the extracted data values and the defined rules.

In accordance with various embodiments of the present invention, a system for generating synthetic data records is provided. The system comprises a memory storing program instructions, at least one processor configured to execute program instructions stored in the memory, and a synthetic data production engine executed by the at least one processor. The system configured to extract data values associated with selected relevant data fields from a predefined dataset including data fields relevant for generation of a selected type of synthetic data records. Further, the system is configured to define rules for generating data values of one or more specific data fields out of the selected relevant data fields based on an analysis of the extracted data values or user-inputs or a combination thereof. Furthermore, the system is configured to evaluate a number of possible synthetic data records, where combinations between the extracted data values associated with two or more of the selected relevant data fields are computed. The computed combinations is the number of possible data records. Yet further, the system is configured to generate the evaluated number of synthetic data records based on the extracted data values and the defined rules.

In accordance with various embodiments of the present invention, a computer program product is provided. The computer program product comprises a non-transitory computer-readable medium having computer-readable program code stored thereon, the computer-readable program code comprising instructions that, when executed by a processor, cause the processor to extract data values associated with selected relevant data fields from a predefined dataset including data fields relevant for generation of a selected type of synthetic data records. Further, rules for generating data values of one or more specific data fields out of the selected relevant data fields are defined based on an analysis of the extracted data values or user-inputs or a combination thereof. Yet further, a number of possible synthetic data records are evaluated, where combinations between the extracted data values associated with two or more of the selected relevant data fields are computed. The computed combinations is the number of possible data records. Yet further, the evaluated number of synthetic data records are generated based on the extracted data values and the defined rules.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term "healthcare data processing applications" as used in the specification refers to any software application intended to process transaction data, such as healthcare claims. It is to be understood, that although the invention is described by way of embodiments exemplifying healthcare application, the scope of the present invention is not limited to healthcare data processing applications, and may be readily extended to other fields, such as banking, ticketing, employee management or any other field requiring high volumes of specific data records with multiple data fields and variable data values. The term "third party payer services" or healthcare payers as used in the specification refers to health care insurance companies. The term "service provider" as used in the specification refers to any person, such as a doctor, pharmacist, etc., or an institution, such as a hospital, clinic, or medical equipment provider. The term "operating field" associated with the data processing applications as used in the specification refers to line of business of the application. The terms "transaction claims" and "healthcare claim data records" have been used interchangeably. The term "predefined dataset" refers to a dataset generated in advance, and may include multiple datasets.

The present invention provides a system and a method for generating synthetic test data records. In particular, the present invention provides a system and a method that can generate high volumes of synthetic data records, such as healthcare claim data records for testing data processing applications associated with one or more operating fields, such as, but not limited to, healthcare insurance. In operation, the present invention provides for retrieving a predefined dataset including data fields relevant for generation of a selected type of synthetic data records. The present invention further provides for validating the predefined dataset for preset requirements, including, but not limited to, validation of dataset format, redundant dataset, relevant data fields, data values associated with the relevant data fields, and redundant data values. Further, the present invention provides for extracting data values associated with selected relevant data fields from the retrieved predefined dataset. Furthermore, the present invention provides for defining rules for generating data values of one or more specific data fields out of the selected relevant data fields. Yet further, the present invention provides for evaluating a number of possible data records by computing combinations between data values of two or more selected relevant data fields, wherein the computed number of combinations is the number of possible data records. Yet further, the present invention provides for generating evaluated number of synthetic data records. Each data record is populated with selected relevant data fields including the one or more specific data fields using a predefined file format, and the selected relevant data fields excluding the one or more specific data fields are populated with the extracted data values using a predefined criteria, and the one or more specific data fields are populated based on the defined rules.

The present invention would now be discussed in context of embodiments as illustrated in the accompanying drawings.

Figure 1:
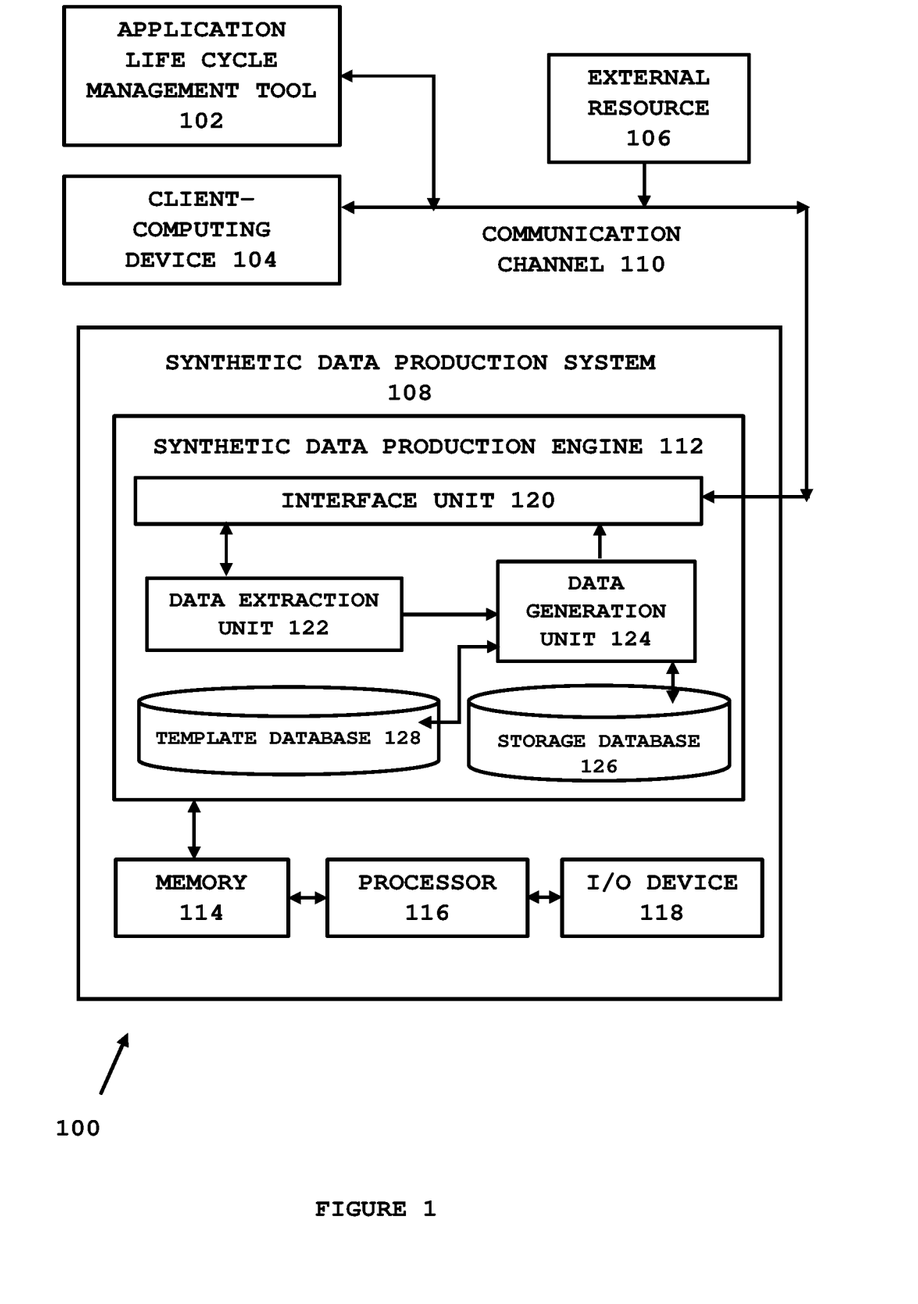
FIG. 1 is a block diagram of a testing environment including a system for generating synthetic test data records, in accordance with various embodiments of the present invention.

Referring to FIG. 1, a block diagram of a testing environment including a system for generating synthetic test data records is illustrated. In an embodiment of the present invention the testing environment 100 includes an Application Lifecycle Management (ALM) tool 102, a client computing device 104, external resources 106, and a system for generating synthetic test data records, herein after referred to as synthetic data production system 108.

In an embodiment of the present invention, the Application Lifecycle Management (ALM) tool 102 is any system configured to manage lifecycle of any application from project planning, requirement gathering, until testing and deployment. In an embodiment of the present invention, the ALM tool 102 may be a software, or a combination of software and hardware. In an embodiment of the present invention as shown in FIG. 1, the ALM tool 102 is a combination of software and hardware. In another embodiment of the present invention, the ALM tool 102 is a software tool executable by one or more client-computing devices (104). Examples of a client-computing device (104) may include, but are not limited to, a general purpose computer such as a desktop, a laptop; a super computer; a microcomputer or any device capable of executing instructions, connecting to a network and sending/receiving high volumes of data. In an embodiment of the present invention, the ALM tool 102 is integrated with a source code management functionality to store the source code of an application which is to be managed, tested and deployed. In another embodiment of the present invention the ALM tool 102 is configured to interface with a code repository (not shown), such as Github to retrieve the source code of an application for managing, testing and deployment. In an embodiment of the present invention, the ALM tool 102 is implemented for developing, managing, testing and deploying a data processing application associated with healthcare insurance for a third-party payer service, such as a healthcare payer. In an embodiment of the present invention, the ALM tool 102 may be deployed locally or remotely by a software development team of a healthcare payer.

In an embodiment of the present invention, the ALM tool 102 is configured to test the one or more features of a healthcare data processing application. In an embodiment of the present invention, the ALM tool 102 is configured to test the one or more features of the healthcare data processing application by generating or consuming test cases developed based on the synthetic data records generated by the synthetic data production system 108. In an example, the healthcare software application may include features, including, but not limited to, healthcare claim adjustment, healthcare claim assessment, and remittance of payment with respect to services rendered by a service provider including, but not limited to, any person, such as a doctor, pharmacist, etc., or an institution, such as a hospital, clinic, or medical equipment provider to a member of healthcare payer/insurer, such as a patient and its dependents based on the healthcare claims. As a result, the healthcare application will require testing with high volumes of healthcare claim data records including a plurality of data fields with varying data values to ensure proper working of the claim analysis and remittance features of the software application.

In an embodiment of the present invention, the ALM tool 102 is configured to interface with the synthetic data production system 108 in order to generate the required synthetic test data records. In an embodiment of the present invention, the ALM tool 102 interfaces with the synthetic data production system 108 via a communication channel 110. Examples of the communication channel 110 may include, but are not limited to, an interface such as a software interface, a physical transmission medium such as a wire, or a logical connection over a multiplexed medium, such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). It is to be understood that the ALM tool 102, as described in the specification is for exemplary purposes only, and the ALM tool 102 does not limit the scope of the present invention in anyway.

In an embodiment of the present invention, the external resource 106 may be a third party system, such as a computing resource, database, software management tool, testing platform, etc. In an exemplary embodiment of the present invention, the external resource 106 is a storage database comprising predefined dataset including data fields relevant for generation of synthetic data records. In an exemplary embodiment of the present invention, where the synthetic test data records are healthcare claim data records also referred to as healthcare insurance claims associated with respective members of a payer service, the predefined dataset comprises member dataset, service provider dataset, charge master dataset and healthcare claim dataset including the data fields relevant for generation of healthcare data records. In an exemplary embodiment of the present invention, the predefined dataset is maintained in an excel file format.

In accordance with various embodiments of the present invention, the synthetic data production system 108 may be a software executable by a computing device or a combination of software and hardware. In an embodiment of the present invention, the synthetic data production system 108 is a software configured for integration with the ALM tool 102. In another embodiment of the present invention, the synthetic data production system 108 is a software installable and executable by any client-computing device 104.

In another embodiment of the present invention as shown in FIG. 1, the synthetic data production system 108 is a combination of a software and a hardware. In an embodiment of the present invention, the synthetic data production system 108 may be implemented as a client-server architecture, wherein a client-computing device 104 and/or an ALM tool 102 accesses a server hosting the synthetic data production system 108 over the communication channel 110. In an exemplary embodiment of the present invention, the functionalities of the synthetic data production system 108 are delivered as Software as a Service (SAAS) to one or more client-computing devices 104 and/or ALM tools 102. In another embodiment of the present invention, the synthetic data production system 108 may be implemented in a cloud computing architecture in which data, applications, services, and other resources are stored and delivered through shared data-centers. In an exemplary embodiment of the present invention, the synthetic data production system 108 is a remote resource implemented over the cloud and accessible for shared usage in a distributed computing architecture by various ALM tool 102 and/or client-computing devices. In an exemplary embodiment of the present invention, the synthetic data production system 108 may be accessed via an IP address/domain name. In another exemplary embodiment of the present invention, the synthetic data production system 108 may be accessed via a user module of the synthetic data production system 108 executable on the ALM tool 102 and/or the client computing device 104.

In accordance with various embodiments of the present invention, the synthetic data production system 108 is configured to interface with the ALM tool 102, the client-computing device 104 and the external resource 106. In an embodiment of the present invention, the synthetic data production system 108 is configured to interface with the ALM tool 102 and/or the client computing device 104 to receive at least the test data generation requests or other inputs. In an embodiment of the present invention, the synthetic data production system 108 is configured to interface with the external resource 106 to retrieve predefined dataset.

In an embodiment of the present invention, the synthetic data production system 108 comprises a synthetic data production engine 112, a memory 114, at least one processor 116, and an Input/output (I/O) device 118. The synthetic data production engine 112 is operated via the at least one processor 116 specifically programmed to execute instructions stored in the memory 114 for executing functionalities of the synthetic data production engine 112 in accordance with various embodiments of the present invention. In accordance with various embodiments of the present invention, the memory 114 may be a Random Access Memory (RAM), a Read Only Memory (ROM), a hard drive disk (HDD), a Solid-state drive(SDD) or any other memory capable of storing data and instructions. In an exemplary embodiment of the present invention, the at least one processor 116 may have one or more cores and may be based on a 32 bit or a 64 bit architecture. In an embodiment of the present invention, the I/O device 118 may be a touch screen device, a key board, a pointer device, a track pad, a display unit, a combination thereof or any other device capable of receiving inputs and outputting results.

In accordance with various embodiments of the present invention, the synthetic data production engine 112 is an automated engine configured to retrieve complex datasets including relevant data fields, validate the retrieved dataset, extract data values from the dataset, define rules, evaluate combinations between the relevant data fields, and generate synthetic data records using the extracted data values and evaluated combinations.

In accordance with various embodiments of the present invention, the synthetic data production engine 112 comprises an interface unit 120, a data extraction unit 122, a data generation unit 124, a storage database 126, and a template database 128. The various units of the synthetic data production engine 112 are operated via the processor 116 specifically programmed to execute instructions stored in the memory 114 for executing respective functionalities of the multiple units (120, 122, 124, 126 and 128) in accordance with various embodiments of the present invention.

In accordance with various embodiments of the present invention, the interface unit 120 is configured to provide communication with the ALM tool 102, the client-computing device 104 and the external resource 106. In an embodiment of the present invention, the interface unit 120 is configured to provide communication with the I/O device 118 associated with the synthetic data production system 108 for updating system configuration, receiving inputs from a user and outputting results.

In an embodiment of the present invention, the interface unit 120 may be configured with any of the following: a web gateway, a mobile gateway, a Graphical User Interface (GUI), an integration interface, an administrator interface and combinations thereof, to facilitate integration and/or interfacing with the ALM tool 102, the client-computing device 104, the external resource 106 and the I/O device 118. In an exemplary embodiment of the present invention, the integration interface is configured with one or more APIs such as REST and SOAP APIs to facilitate smooth interfacing and/or integration with the ALM tool 102, the client-computing device 104 and the external resource 106. In an exemplary embodiment of the present invention, the administrator interface provides communication with the Input/output device 118 for receiving administration configuration from system admins.

In an embodiment of the present invention, the GUI is accessible on the ALM tool 102, the client-computing device 104 and/or the I/O device 118 to facilitate user interaction. In an exemplary embodiment of the present invention, the Graphical User Interface(GUI) allows a user to select an operating field of the synthetic test data records or the data processing application which is to be tested, select source database, select the predefined dataset for retrieval, retrieve predefined dataset, view and delete retrieved dataset select relevant data fields, define rules, add/remove or modify data fields of the retrieved dataset, and receive test data records amongst other things. In an embodiment of the present invention, the graphical user interface (GUI) associated with the interface unit 120 may be accessed from the ALM tool 102 and the client-computing device 104 through a web gateway. In another embodiment of the present invention, the GUI associated with the interface unit 120 may be accessed by the mobile gateway using a user module installable on the ALM tool 102 and/or the computing device 104. In an embodiment of the present invention, where the synthetic data production system 108 is a software installable and executable by any client-computing device 104, the GUI along with other units are locally accessible on the client-computing device 104.

In an embodiment of the present invention, the interface unit 120 is configured to receive a test data generation request from the ALM tool 102 and/or the client-computing device 104. In an embodiment of the present invention, the received test data generation request includes the operating field of the synthetic test data records or the data processing application which is to be tested, a type of synthetic data records which are to be generated, such as healthcare insurance claims and a practice area, also referred to as Line of Business(LOB) associated with the operating field. In an exemplary embodiment of the present invention, the operating field may be selected from healthcare insurance, banking, and employee management etc. In an exemplary embodiment of the present invention, the Line of Business (LOB) may be selected from, but is not limited to, Medicaid, Medicare, Dental, Vision, Commercial and Behavioral Health. In another embodiment of the present invention, the interface unit 120 is configured to provide manual selection of the operating field of the synthetic test data, the type of synthetic data record and the Line of Business(LOB).

In an embodiment of the present invention, the data extraction unit 122 is configured to receive the test data generation request or selected inputs from the interface unit 120. In accordance with various embodiments of the present invention, the data extraction unit 122 is configured to initiate retrieval of predefined dataset including data fields relevant for generation of synthetic data records on receiving the test data generation request or selection input via the interface unit 120. In an embodiment of the present invention, the data extraction unit is configured to automatically retrieve the predefined dataset from the external resource 106 based on the operating field and the type of synthetic data records. In operation, the data extraction unit 122 is configured to identify the predefined datasets required for generation of synthetic data records based on the operating field and the type of synthetic data record using a data mapping technique or a machine learning techniques. In an embodiment of the present invention, the data mapping technique includes identifying the predefined dataset from a mapping table including the operating field and the type of synthetic data records mapped with corresponding predefined dataset and a source of the dataset. Further, the data extraction unit 122 is configured to retrieve the identified dataset from predetermined source location. In an example, where the selected operating field is healthcare insurance, and the type of synthetic data record is healthcare claim, the data extraction unit 122 identifies the predefined dataset comprising member dataset, service provider dataset, charge master dataset and healthcare claim dataset for retrieval. Further, the data extraction unit 122 retrieves the identified dataset from the external resource 106.

In another embodiment of the present invention, the data extraction unit 122 provides selection of predefined datasets available for retrieval based on the selected operating field and the type of synthetic data record. In an example, where the selected operating field is healthcare insurance, the data extraction unit 122 via the interface unit 120 is configured to provide selection of predefined datasets comprising member dataset, service provider dataset, charge master dataset and healthcare claim dataset including the data fields relevant for generation of healthcare data records. In an embodiment of the present invention, the address of the source location of the predefined dataset may be received via an input from a user.

In accordance with various embodiments of the present invention, the data extraction unit 122 is further configured to validate the predefined dataset during the retrieval process. In an embodiment of the present invention, the data extraction unit 122 is configured to validate the predefined dataset for preset requirements using data analytics or machine learning techniques. In an embodiment of the present invention, the preset requirements, include, but not limited to, validation of dataset format, redundant dataset, relevant data fields, missing data values associated with the relevant data fields, redundant data values and optionally special characters associated with the data values. In an embodiment of the present invention, the relevant data fields are validated based on the type of synthetic data record and the selected Line of Business(LOB) associated with the selected operating field using data analytics or machine learning techniques. In an exemplary embodiment of the present invention, the dataset including special characters are rejected. In an exemplary embodiment of the present invention, examples of special characters, include, but are not limited to, apostrophe, tilde, exclamation point, at symbol, pound, dollar sign, percentage, carat, ampersand, asterisk, left and right parenthesis, left and right brace, opening and closing brackets, plus, equals, question mark, greater than, less than, quotation marks, colon, semi colon, vertical bar.

Figure 1A:
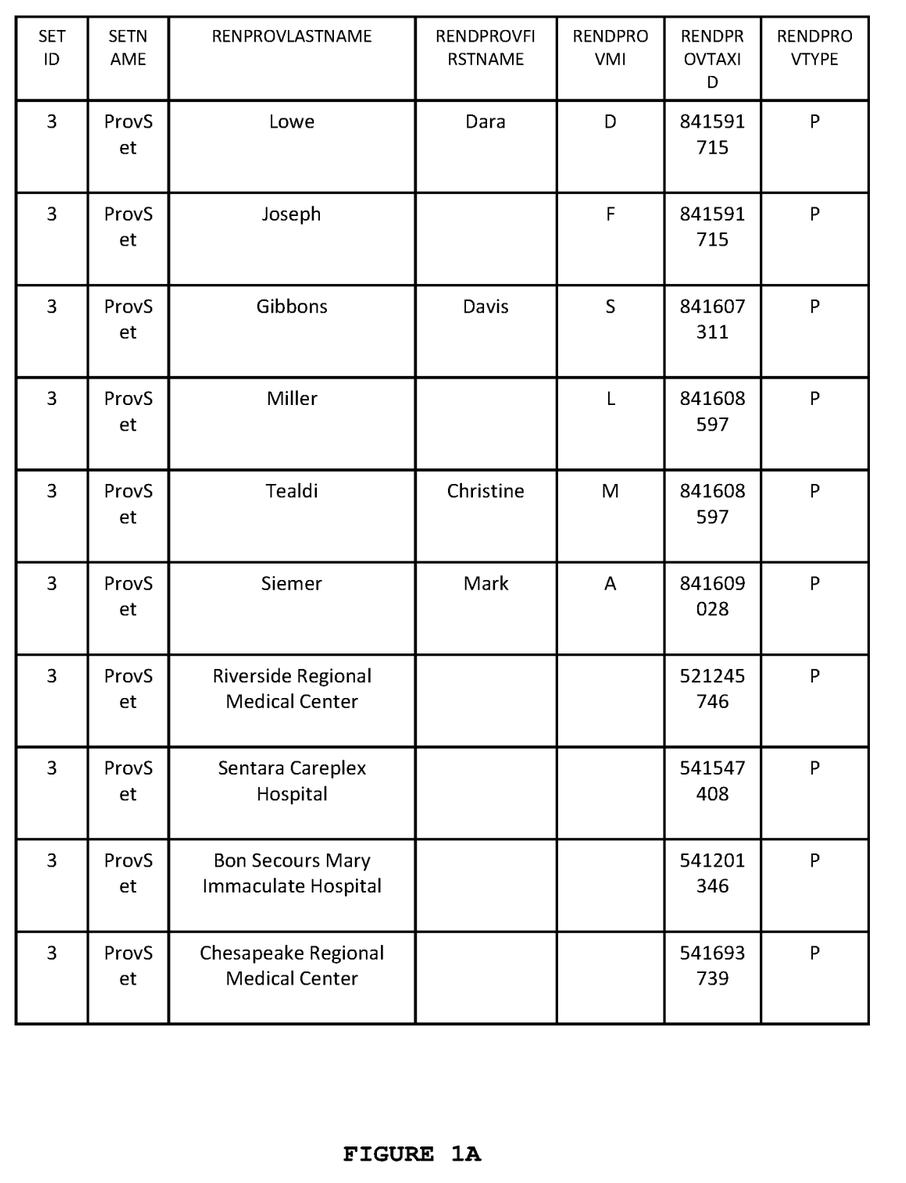
FIG. 1A, is an exemplary table representing retrieved service provider dataset with data fields and associated data values, in accordance with an embodiment of the present invention.

In an embodiment of the present, the data extraction unit 122 is configured to generate error messages for unsuccessful validation of any of the preset requirements via the interface unit 120. In accordance with various embodiments of the present invention, the successfully validated predefined dataset is retrieved and maintained in the storage database 126. In accordance with various embodiments of the present invention, the retrieved predefined dataset is represented in a configurable tabular form including various data fields and associated data values via the interface unit 120 for modification or deletion of the dataset, and/or modification/deletion or selection of one or more data fields from the relevant data fields required in the synthetic data records. In an example, where the selected operating field is healthcare insurance, the retrieved predefined datasets including the member dataset, the service provider dataset, the charge master dataset and the healthcare claim dataset are maintained in the storage database 126. Further, the member dataset, the service provider dataset, the charge master dataset and the healthcare claim dataset are represented in the form of respective tables with respective data fields and associated data values. As shown in FIG. 1A, a table representing retrieved service provider dataset with data fields and associated data values is exemplified.

In an exemplary embodiment of the present invention, the service provider dataset includes data associated with one or more service providers. Each service provider dataset further comprises data fields populated with realistic data values, where the data values are representative of information associated with respective service provider. In an exemplary embodiment of the present invention, the relevant data fields associated with service provider dataset, hereinafter referred to as service provider data fields include, but are not limited to, servicing/rendering provider first name, last name, provider type, National Provider Identifier (NPI) associated with the provider, billing details, provider address, provider city, provider specialty identifier and network status. Examples of provider type may include, but are not limited to, professional, institutional, dental etc.

In an exemplary embodiment of the present invention, the member dataset includes data associated with members of the healthcare payer and optionally dependents of the members. Each member dataset comprises data fields populated with realistic data values, where the data values are representative of information associated with respective members. In an exemplary embodiment of the present invention, the relevant data fields associated with member dataset, hereinafter referred to as member data fields include, but are not limited to, member name, relationship identifying the member as subscriber or dependent of the subscriber, subscriber ID, last name of the subscriber or the dependent, member date of birth, gender, Primary Care Physician name, if services need to be provided by a Primary Care Physician (PCP), and member address including city, state and zip code.

In an exemplary embodiment of the present invention, the healthcare claim dataset comprises relevant data fields associated with health insurance claims, hereinafter referred to as claim data fields. Each claim data field is populated with data values. In an exemplary embodiment of the present invention, the claim data fields include, but not are limited to, claim category, claim subtype, lowest service age of a member for a service, service gender of member, procedure code, diagnosis code, and place of service. Examples of place of service data values, include, but are not limited to, office, outpatient hospital, inpatient hospital, home, etc. Examples of claim category data values may include, but are not limited to, Medical(M), Dental(D), Behavioral(B), Health(H), etc. Examples of claim sub-type may include, but are not limited to, Professional(P) and Institutional(I).

In an exemplary embodiment of the present invention, the charge master dataset includes data fields populated with data values associated with charge masters of one or more service providers, hereinafter referred to as charge master data fields. In an exemplary embodiment of the present invention, the charge master data fields include, but not are limited to, charge master type, procedure code and/or revenue code, charge amount for the procedure code and effective date and termination date of the charge master. In an exemplary embodiment of the present invention, the charge master data fields "effective date" and "termination date" enables assignment of correct charge amount to a synthetic healthcare claim based on specific date of service as explained in later in the specification with reference to predefined criteria. Examples of charge master type include, but are not limited to Professional(P), Institutional(I) and Dental(D).

In accordance with various embodiments of the present invention, the data extraction unit 122 is configured to extract data values associated with selected relevant data fields out of the relevant data fields from the retrieved predefined dataset. In an embodiment of the present invention, the data extraction unit 122 is configured to extract data values associated with selected relevant data fields using one or more data extraction techniques. In an embodiment of the present invention, the selection of relevant data fields is based on the selected operating field and the Line of Business(LOB) associated with the operating field. In another embodiment of the present invention, the selection of relevant data fields is based on user-inputs received via the interface unit 120.

In an example, where the selected operating field is healthcare insurance, the data extraction unit 122 is configured to extract data values associated with selected data fields from the member data fields, service provider data fields, claim data fields and charge master data fields of the retrieved member dataset, the service provider dataset, the healthcare claim dataset and the charge master dataset, respectively.

In an exemplary embodiment of the present invention, the selected member data fields include, but are not limited to, member name, relationship identifying the member as subscriber or dependent of the subscriber, subscriber ID, last name of the subscriber or the dependent, member date of birth, gender, Primary Care Physician name, if services need to be provided by a Primary Care Physician (PCP), member address, including city, state and zip code. In an exemplary embodiment of the present invention, the selected service provider data fields include, but are not limited to, servicing/rendering provider first name, last name, provider type, National Provider Identifier (NPI) associated with the provider, billing details, provider address, provider city, provider specialty identifier and network status. In an exemplary embodiment of the present invention, the selected claim data fields include, but are not limited to, claim category, claim subtype, lowest service age of a member for a service, service gender of member, procedure code, diagnosis code, and place of service. In an exemplary embodiment of the present invention, the selected the charge master data fields include, but are not limited to, charge master type, procedure code, charge amount for the procedure code and effective date and termination date of the charge master. Examples of charge master type include, but are not limited to Professional(P), Institutional(I) and Dental(D).

In accordance with various embodiments of the present invention, the data generation unit 124 is configured to receive the extracted data values associated with selected relevant data fields from the data extraction unit 122. In accordance with various embodiments of the present invention, the data generation unit 124 is configured to define rules for generating data values of one or more specific data fields out of the selected relevant data fields required in the data records based on an analysis of the extracted data values of selected relevant data fields or user-inputs or a combination thereof. In an embodiment of the present invention, the specific data fields are representative of one or more selected relevant data fields whose data values are missing or undefined in the predefined dataset or whose data values are dependent on the data values of other selected relevant fields. In an embodiment of the present invention, the analysis of the extracted data values includes identifying the one or more selected relevant data fields having no associated data values and/or whose data values are dependent on the data values of other one or more selected relevant data fields. In an embodiment of the present invention, the one or more specific data fields are identified and selected based on user-inputs. In an embodiment of the present invention, the defined rules comprise assigning a user-defined value or a default data value to the one or more specific data fields having no associated data value. In an embodiment of the present invention, the defined rules comprise assigning a user-defined data value or a predefined data value to the one or more specific data fields whose data values are dependent on other one or more selected relevant data fields based on the data values of said other one or more selected relevant data fields. In an embodiment of the present invention, the rules are defined based on user-inputs. In an example, where the selected operating field is healthcare insurance, and the type of synthetic data record is healthcare claim, the data generation unit 124 is configured to define rules for generating data values for specific data fields, including, but not limited to, professional default charge amount, institutional default charge amount, anesthesia minutes, medical supply units, and ambulance miles. In the example, the data values for the data fields anesthesia minutes, medical supply units, and ambulance miles are defined based on the data values of data field procedure code. In particular, rules are defined such that data value for anesthesia minutes are populated with a predefined or user-defined value if procedure code value is between 00100 and 01992. The data value of medical supply units is populated with a predefined or user-defined value if the procedure code value is between A4206 to A9999. The data value of ambulance miles is populated with a predefined or user-defined value if the procedure code value is A0080, A0090, A0160 etc. The data value of professional charge amount is populated with a user-defined value of 1.00, if the extracted data value for professional charge amount from the predefined dataset is undefined, and a default value of 0.00 is assigned if the use-defined value is also not defined. The data value of institutional charge amount is populated with a user-defined value of 2.00 if the extracted data value for institutional charge amount from the predefined dataset is undefined, and a default value of 0.00 is assigned if the use-defined value is also not defined.

In accordance with various embodiments of the present invention, the data generation unit 124 is configured to evaluate a number of possible data records by computing combinations between data values of two or more selected relevant data fields. In accordance with various embodiments of the present invention, the computed number of combinations is the number of possible data records. In an embodiment of the present invention, the data generation unit 124 is configured to compute combinations between data values of two or more selected relevant data fields by deriving a Cartesian product of the data values of two or more selected relevant data fields. In an embodiment of the present invention, combinations between data values of two or more selected relevant data fields are computed by deriving a Cartesian product of the highest and the lowest data values associated with respective two or more selected relevant data fields. In an example, where the selected operating field is healthcare insurance, and the type of synthetic data record is healthcare claim, the data generation unit 124 is configured to compute combinations between the data values of two or more selected relevant data fields from selected member data fields, service provider data fields, claim data fields and charge master data fields. In an exemplary embodiment of the present invention, the data generation unit 124 is configured to compute combinations between data values of two or more selected relevant data fields, including, procedure code, diagnosis codes, and place of service. As already described above place of service values further include provider specialty, provider network status, and if services need to be provided by a primary care physician (PCP). In operation, in an embodiment of the present invention, the data generation unit 124 is configured to determine the lowest and the highest data values associated with the selected two or more data fields, including procedure code, diagnosis codes and place of service based on an analysis of extracted data values of selected two or more data fields. Further, the data generation unit 124 is configured to compute combinations by deriving a Cartesian product between the lowest and highest data values of each of the selected two or more data fields. For example, a product of procedure code with other data fields, such as diagnosis code and place of service is derived. The computed number of combinations is the number of possible data records.

Table 1 below is an exemplary table of procedure code and diagnosis code low and high values.

TABLE 1

| ProcedureCode Low | ProcedureCodeHigh | DiagnosisCodeLow | DiagnosisCodeHigh |
|---|---|---|---|
| 99211 | 99215 | H6090 | H6093 |

In view of table 1, the following four combinations (99211, H6090), (99211, H6093), (99215, H6090) and (99215, H6093) between the procedure code low and high value with diagnosis code low and high values are derived. Therefore, the number of possible healthcare claims are four.

Table 2 below is an exemplary table of low and high values of procedure code, diagnosis code and place of service.

TABLE 2

| ProcedureCodeLow | ProcedureCodeHigh | DiagnosisCodeLow | DiagnosisCodeHigh | PlaceofServiceLow | PlaceofServiceHigh |
|---|---|---|---|---|---|
| 69201 | 69201 | H6121 | H6121 | 11 | 22 |

In view of table 2, since procedure code low and high values are same and diagnosis code low and high values are also same, the following two combinations (69201,H6121,11) and (69201,H6121,22) between the high and low values of each data field are derived. Therefore, the number of possible healthcare claims are two.

In accordance with various embodiments of the present invention, the data generation unit 124 is configured to generate the evaluated number of synthetic data records using a predefined file format based on the extracted data values and data values of one or more specific data fields. In operation, the data generation unit 124 is configured to generate the evaluated number of synthetic data records populated with the selected relevant data fields including the one or more specific data fields. The selected relevant data fields including the one or more specific data fields are populated and arranged in each of the data records based on a predefined file format. In an embodiment of the present invention, the predefined file format is selected based on the type of synthetic data record, and a sub-type of the synthetic data record. In an embodiment of the present invention, the predefined file format is maintained in the template database 128. In an example, where the operating field is healthcare insurance, the sub-type of the synthetic data record is selected from professional, institutional and dental, and the predefined file format is selected from 837I, 837P, and 837D. Further, the data generation unit 124 is configured to populate the selected relevant fields excluding the one or more specific data fields of each of the data records with the extracted data values using a predefined criteria and the one or more specific data fields of each of the data records are populated based on the defined rules as described above. In particular, the data values for the one or more specific data fields of each data record is populated based on the assigned data values of one or more selected data fields in each data records using the defined rules. In an embodiment of the present invention, the predefined criteria is selected from random assignment, scenario-based assignment, specific format based assignment and a combination thereof. In embodiment of the present invention, the predefined criterion is selected based on user-inputs. In an embodiment of the present invention, the criterion random assignment comprises random assignment of the extracted data values associated with selected relevant data fields to the corresponding selected relevant data fields of respective data records. In an embodiment of the present invention, the criterion scenario-based assignment comprises assignment of extracted data values associated with selected relevant data fields to the corresponding selected relevant data fields of respective data records based on user-defined scenarios, where one or more data fields may be populated with particular user-defined range of values. In an embodiment of the present invention, the criterion specific format based assignment comprises assignment of extracted data values associated with selected relevant fields to the corresponding selected relevant data fields of respective data records based on pre-selected specific formats.

In an example, where the selected operating field is healthcare insurance, and the type of synthetic data record is healthcare claim, each of the evaluated number of healthcare claims are populated with selected relevant data fields including the one or more specific data fields based on the predefined file format selected from 837I, 837P, and 837D. Further, the data values of the selected relevant data fields excluding the specific data fields for each healthcare claim are populated with extracted data values associated with corresponding selected relevant data fields using a predefined criterion selected from random assignment, scenario-based, specific format or a combination thereof. In particular, the extracted data values of the selected member data fields, service provider data fields, claim data fields and charge master data fields are assigned to corresponding data fields of the healthcare claim using predefined criterion. Further, the data values for one or more specific data fields are populated based on the defined rules of step 206. In an example, the data values of selected member data fields, selected provider data fields, claim data fields and charge master data fields are randomly assigned to the corresponding data fields of each of the healthcare claims based on random assignment criterion. In an example, the data values of selected member data fields are randomly assigned to the corresponding data fields of each of the healthcare claims based on a selected age range and gender as per scenario-based criterion. Similarly, the data values of service provider data fields are randomly assigned to the corresponding data fields of each of the healthcare claims based on a selected specialty and network status as per scenario-based criterion.

In another example, the data values of selected member data fields, such as member name, age etc. are assigned to the healthcare claim by matching data values of one or more member data fields, such as National Provider Identifier (NPI) with similar service provider data field based on specific format based criterion. In another example, the data values of selected service provider data fields, such as provider name are assigned to the healthcare claim by matching data values of member data fields, such as name of Primary Care Physician(PCP) with service provider data field, such as provider name based on specific format based criterion. In yet another example, the data values of selected charge master data fields may be assigned to the corresponding data fields of each of the healthcare claims based on data values of one or more claim data fields, such as procedure code and date service value as per scenario-based assignment criterion. In yet another example, the data values of selected member data field, such as Primary Care Physician may be assigned to the corresponding data fields of each of the healthcare claims based on Line of Business associated with selected operating field as per specific format based assignment criterion.

Advantageously, the system of the present invention affords a technical effect in the field of software development and testing by enabling generation of high volumes of synthetic test data records in real time. Further, the system of the present invention enables on-demand generation of versatile, scalable, and secure synthetic test data records that are agnostic to data processing applications, further leading to an improvement in the field of software development and testing. Furthermore, the system of the present invention affords significant reduction in time duration required for generation of high volumes of synthetic test data records. Yet further, the system of the present invention provides for generation of synthetic test data records having realistic data values without using confidential data, such as Protected Health Information(PHI) in case of healthcare data records. Yet further, the system of the present invention provides for generation of synthetic test data records based on various scenarios, further facilitating improved test case coverage for testing data processing applications.

Figure 2:
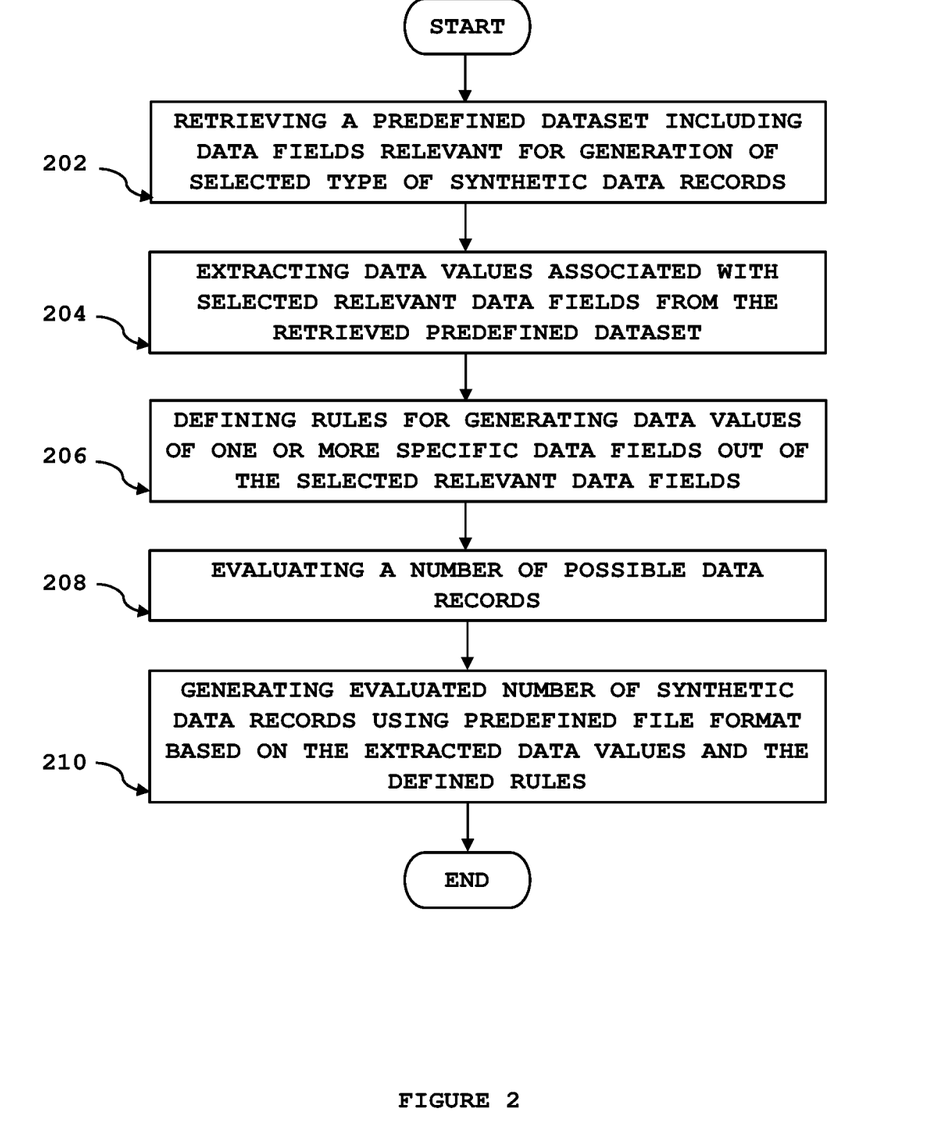
FIG. 2 is a flowchart illustrating a method for generating synthetic test data records, in accordance with various embodiments of the present invention.

Referring to FIG. 2 a flowchart illustrating a method for generating synthetic test data records, in accordance with various embodiments of the present invention.

At step 202, a predefined dataset including data fields relevant for generation of a selected type of synthetic data records is retrieved. In an embodiment of the present invention, a predefined dataset including relevant data fields is retrieved based on a selected operating field and a type of synthetic data record. In an embodiment of the present invention, the predefined data set is retrieved from an external resource (106 of FIG. 1) based on the selected operating field and the type of synthetic data records. In operation, the retrieval of the predefined dataset including data fields relevant for generation of synthetic data records is automatically initiated on receiving the test data generation request or selected inputs, including the operating field of the synthetic test data record, the type of synthetic data record and the practice area, also referred to as Line of Business(LOB) associated with the operating field. In an embodiment of the present a test data generation request is received from an ALM tool (102 of FIG. 1) and/or the client-computing device (104 of FIG. 1). In an embodiment of the present invention, the received test data generation request includes the operating field of the synthetic test data records or the data processing application which is to be tested, a type of synthetic data records which are to be generated, such as healthcare insurance claims and a practice area, also referred to as Line of Business(LOB) associated with the operating field. In an exemplary embodiment of the present invention, the operating field may be selected from healthcare insurance, banking, and employee management etc. In an exemplary embodiment of the present invention, the Line of Business(LOB) may be selected from, but is not limited to, Medicaid, Medicare, Dental, Vision, Commercial and Behavioral Health. In an embodiment of the present invention, the operating field of the synthetic test data records, the type of synthetic data records and the Line of Business(LOB) are received based on user-selection via ALM tool (102 of FIG. 1) and/or the client-computing device (104 of FIG. 1) and/or an I/O device (118 of FIG. 1). Further, the predefined datasets required for generation of synthetic data records are identified based on the selected operating field and the type of synthetic data record using a data mapping technique or a machine learning techniques. In an embodiment of the present invention, the data mapping technique comprises identifying the predefined dataset from a mapping table including the operating field and the type of synthetic data records mapped with corresponding predefined dataset and a source of said predefined dataset. In an example, where the selected operating field is healthcare insurance, and the type of synthetic data record is healthcare claim, the predefined dataset comprising member dataset, service provider dataset, charge master dataset and healthcare claim dataset is identified for retrieval. Further, the identified dataset is validated for preset requirements, and retrieved from a predetermined source location or the external resource (106 of FIG. 1).

In another embodiment of the present invention, the predefined datasets are selected by a user based on the selected operating field and the type of synthetic data record from a source location. In an embodiment of the present invention, the address of the source location of the predefined dataset is received via user-input. In an example, where the selected operating field is healthcare insurance, the predefined datasets comprising member dataset, service provider dataset, charge master dataset and healthcare claim dataset including the data fields relevant for generation of healthcare data records are selected based on user-inputs.

In accordance with various embodiments of the present invention, the predefined dataset is validated during the retrieval process. In an embodiment of the present invention, the predefined dataset is validated for preset requirements using data analytics or machine learning techniques. In an embodiment of the present invention, the preset requirements, include, but not limited to, validation of dataset format, redundant dataset, relevant data fields, missing data values associated with the relevant data fields, redundant data values and optionally special characters associated with the data values. In an embodiment of the present invention, the relevant data fields are validated based on type of synthetic data record and the selected Line of Business (LOB) associated with the selected operating field using data analytics or machine learning techniques. In an exemplary embodiment of the present invention, the dataset including special characters are rejected. In an exemplary embodiment of the present invention, examples of special characters, include, but are not limited to, apostrophe, tilde, exclamation point, at symbol, pound, dollar sign, percentage, carat, ampersand, asterisk, left and right parenthesis, left and right brace, opening and closing brackets, plus, equals, question mark, greater than, less than, quotation marks, colon, semi colon, vertical bar.

In an embodiment of the present, error messages are generated for unsuccessful validation of any of the preset requirements and transmitted to a user. In accordance with various embodiments of the present invention, the successfully validated predefined dataset is retrieved and maintained in a storage database (126 of FIG. 1). In accordance with various embodiments of the present invention, the retrieved predefined dataset is represented in a configurable tabular form including the data fields and associated data values, by which the predefined dataset can be modified or deleted, and/or one or more data fields required in the selected type of synthetic data records can be selected, modified or deleted. In an example, where the selected operating field is healthcare insurance, the retrieved predefined datasets including the member dataset, the service provider dataset, the charge master dataset and the healthcare claim dataset are maintained in the storage database 126. Further, the member dataset, the service provider dataset, the charge master dataset and the healthcare claim dataset are represented in the form of respective tables with respective data fields and associated data values. As shown in FIG. 1A, a table representing retrieved service provider dataset with data fields and associated data values is exemplified.

In an exemplary embodiment of the present invention, the service provider dataset includes data associated with one or more service providers. Each service provider dataset further comprises data fields populated with realistic data values, where the data values are representative of information associated with respective service provider. In an exemplary embodiment of the present invention, the relevant data fields associated with the service provider dataset, hereinafter referred to as service provider data fields include, but are not limited to, servicing/rendering provider first name, last name, provider type, National Provider Identifier (NPI) associated with the provider, billing details, provider address, provider city, provider specialty identifier and network status. Examples of provider type may include, but are not limited to, professional, institutional, dental etc.

In an exemplary embodiment of the present invention, the member dataset includes data associated with members of the healthcare payer and optionally dependents of the members. Each member dataset comprises data fields populated with realistic data values, where the data values are representative of information associated with respective members. In an exemplary embodiment of the present invention, the relevant data fields associated with member dataset, hereinafter referred to as member data fields include, but are not limited to, member name, relationship identifying the member as subscriber or dependent of the subscriber, subscriber ID, last name of the subscriber or the dependent, member date of birth, gender, Primary Care Physician name, if services need to be provided by a Primary Care Physician (PCP), and member address, including city, state and zip code.

In an exemplary embodiment of the present invention, the healthcare claim dataset comprises relevant data fields associated with health insurance claims, hereinafter referred to as claim data fields. Each claim data field is populated with data values. In an exemplary embodiment of the present invention, the claim data fields include, but are not limited to, claim category, claim subtype, lowest service age of a member for a service, service gender of member, procedure code, diagnosis code, and place of service. Examples of place of service data values, include, but are not limited to, office, outpatient hospital, inpatient hospital, home, etc. Examples of claim category data values may include, but are not limited to, Medical(M), Dental(D), Behavioral(B), Health(H), etc. Examples of claim sub-type may include, but are not limited to, Professional(P) and Institutional(I).

In an exemplary embodiment of the present invention, the charge master dataset includes data fields populated with data values associated with charge masters of one or more service providers, hereinafter referred to as charge master data fields. In an exemplary embodiment of the present invention, the charge master data fields include, but not are limited to, charge master type, procedure code and/or revenue code, charge amount for the procedure code, effective date of the charge master and termination date of the charge master. In an exemplary embodiment of the present invention, the charge master data fields "effective date" and "termination date" enables assignment of correct charge amount to a synthetic healthcare claim based on specific date of service as explained in with reference to predefined criteria. Examples of charge master type include, but are not limited to Professional(P), Institutional(I) and Dental(D).

At step 204, data values associated with selected relevant data fields are extracted from the retrieved predefined dataset. In an embodiment of the present invention, data values associated with selected relevant data fields out of the relevant data fields are extracted from the retrieved predefined dataset using one or more data extraction techniques. In an embodiment of the present invention, the selection of relevant data fields is based on the selected operating field and the Line of Business(LOB) associated with the operating field. In another embodiment of the present invention, the selection of relevant data fields is based on user-inputs.

In an example, where the selected operating field is healthcare insurance, the data values associated with selected relevant data fields are extracted from the member data fields, service provider data fields, claim data fields and charge master data fields of the retrieved member dataset, the service provider dataset, the healthcare claim dataset and the charge master dataset, respectively.

In an exemplary embodiment of the present invention, the selected member data fields include, but are not limited to, member name, relationship identifying the member as subscriber or dependent of the subscriber, subscriber ID, last name of the subscriber or the dependent, member date of birth, gender, Primary Care Physician name, if services need to be provided by a Primary Care Physician (PCP), member address, including city, state and zip code. In an exemplary embodiment of the present invention, the selected service provider data fields include, but are not limited to, servicing/rendering provider first name, last name, provider type, National Provider Identifier (NPI) associated with the provider, billing details, provider address, provider city, provider specialty identifier and network status. In an exemplary embodiment of the present invention, the selected claim data fields include, but not are limited to, claim category, claim subtype, lowest service age of a member for a service, service gender of member, procedure code, diagnosis code, and place of service. In an exemplary embodiment of the present invention, the selected the charge master data fields include, but not are limited to, charge master type, procedure code and charge amount for the procedure code, effective date of the charge master and termination date of the charge master. Examples of charge master type include, but are not limited to Professional(P), Institutional(I) and Dental(D).

At step 206, rules for generating data values of one or more specific data fields out of the selected relevant data fields are defined. In an embodiment of the present invention, the specific data fields are representative of one or more selected relevant data fields having no associated data values in the predefined dataset, or data values of which are dependent on the data values of other selected relevant fields. In an embodiment of the present invention, the one or more specific data fields out of the selected relevant data fields required in the data records are identified based on an analysis of the extracted data values of selected relevant data fields or user-inputs or a combination thereof. In an embodiment of the present invention, the analysis of the extracted data values includes identifying the one or more selected relevant data fields having no associated data values and/or whose data values are dependent on the data values of other one or more selected relevant data fields. In an embodiment of the present invention, the one or more specific data fields are identified and selected based on user inputs. In an embodiment of the present invention, the rules are defined based on user-inputs. In an embodiment of the present invention, the defined rules comprise assigning a user-defined value or a default data value to the one or more specific data fields having no associated data value. In an embodiment of the present invention, the defined rules comprise assigning a user-defined data value or a predefined data value to the one or more specific data fields whose data values are dependent on other one or more selected relevant data fields based on the data values of said other one or more selected relevant data fields. In an example, where the selected operating field is healthcare insurance, and the type of synthetic data record is healthcare claim, rules for generating data values for specific data fields, including, but not limited to, professional default charge amount, institutional default charge amount, anesthesia minutes, medical supply units, and ambulance miles are defined. In the example, the data values for the data fields anesthesia minutes, medical supply units, and ambulance miles are defined based on the data values of data field procedure code. In particular, rules are defined such that data value for anesthesia minutes are populated with a predefined or user-defined value if procedure code value is between 00100 and 01992. The data value of medical supply units is populated with a predefined or user-defined value if the procedure code value is between A4206 to A9999. The data value of ambulance miles is populated with a predefined or user-defined value if the procedure code value is A0080, A0090, A0160 etc. The data value of professional charge amount is populated with a user-defined value of 1.00, if the extracted data value for professional charge amount from the predefined dataset is undefined, and a default value of 0.00 is assigned if the use-defined value is also not defined. The data value of institutional charge amount is populated with a user-defined value of 2.00 if the extracted data value for institutional charge amount from the predefined dataset is undefined, and a default value of 0.00 is assigned if the use-defined value is also not defined.

At step 208, a number of possible data records are evaluated. In an embodiment of the present invention, the number of possible data records are evaluated by computing combinations between data values of two or more selected relevant data fields. The computed number of combinations is the number of possible data records. In an embodiment of the present invention, combinations between data values of two or more selected relevant data fields are computed by deriving a Cartesian product of the data values of two or more selected relevant data fields. In an embodiment of the present invention, combinations between data values of two or more selected relevant data fields are computed by deriving a Cartesian product of the highest and the lowest data values associated with respective two or more selected relevant data fields. In an example, where the selected operating field is healthcare insurance, and the type of synthetic data record is healthcare claim, combinations between the data values of two or more selected relevant data fields from member data fields, service provider data fields, claim data fields and charge master data fields are computed. In an exemplary embodiment of the present invention, combinations between data values of two or more selected relevant data fields, including, procedure code, diagnosis codes, and place of service are computed. As already described above place of service values further include provider specialty, provider network status, and if services need to be provided by a primary care physician (PCP). In operation, in an embodiment of the present invention, the lowest and the highest data values associated with the selected two or more data fields, including procedure code, diagnosis codes and place of service are determined based on an analysis of the extracted data values of selected two or more data fields. Further, combinations are computing by deriving a Cartesian product between the lowest and highest data values of each of the selected two or more data fields. For example, a product of procedure code with other data fields, such as diagnosis code and place of service is derived. The computed number of combinations is the number of possible data records.

Table 1 below is an exemplary table of procedure code and diagnosis code low and high values.

TABLE 1

| ProcedureCodeLow | ProcedureCodeHigh | DiagnosisCodeLow | DiagnosisCodeHigh |
|---|---|---|---|
| 99211 | 99215 | H6090 | H6093 |

In view of table 1, the following four combinations (99211, H6090), (99211, H6093), (99215, H6090) and (99215, H6093) between the procedure code low and high value with diagnosis code low and high values are derived. Therefore, the number of possible healthcare claims are four.

Table 2 below is an exemplary table of low and high values of procedure code, diagnosis code and place of service.

TABLE 2

| ProcedureCodeLow | ProcedureCodeHigh | DiagnosisCodeLow | DiagnosisCodeHigh | PlaceofServiceLow | PlaceofServiceHigh |
|---|---|---|---|---|---|
| 69201 | 69201 | H6121 | H6121 | 11 | 22 |

In view of table 2, since procedure code low and high values are same and diagnosis code low and high values are also same, the following two combinations (69201,H6121, 11) and (69201,H6121,22) between the high and low values of each data field are derived. Therefore, the number of possible healthcare claims are two.

At step 210, evaluated number of synthetic data records are generated using a predefined file format based on the extracted data values and the defined rules. In an embodiment of the present invention, the evaluated number of synthetic data records populated with the selected relevant data fields including the one or more specific data fields are generated. The selected relevant data fields including the one or more specific data fields in each of the data records are populated and arranged based on a predefined file format. In an embodiment of the present invention, the predefined file format is selected based on the type of synthetic data record, and a sub-type of the synthetic data record. In an embodiment of the present invention, the predefined file format is maintained in a template database (128 of FIG. 1). In an example, where the operating field is healthcare insurance, the sub-type of the synthetic data record is selected from professional, institutional and dental, and the predefined file format is selected from 8371, 837P, and 837D. Further, the selected relevant fields excluding the one or more specific data fields of each of the data records are populated with the extracted data values using a predefined criteria and the one or more specific data fields of each of the data records are populated based on the defined rules of step 206. In particular, the data values for the one or more specific data fields of each data record is populated based on the assigned data values of one or more selected data fields in each data records using the defined rules of step 206. In an embodiment of the present invention, the predefined criterion is selected from random assignment, scenario-based assignment, specific format based assignment and a combination thereof. In embodiment of the present invention, the predefined criterion is selected based on user-inputs. In an embodiment of the present invention, the criterion random assignment comprises random assignment of the extracted data values associated with selected relevant data fields to the corresponding selected relevant data fields of respective data records. In an embodiment of the present invention, the criterion scenario-based assignment comprises assignment of extracted data values associated with selected relevant data fields to the corresponding selected relevant data fields of respective data records based on user-defined scenarios, where one or more data fields may be populated with particular user-defined range of values. In an embodiment of the present invention, the criterion specific format based assignment comprises assignment of extracted data values associated with selected relevant fields to the corresponding selected relevant data fields of respective data records based on pre-selected specific formats.

In an example, where the selected operating field is healthcare insurance, and the type of synthetic data record is healthcare claim, each of the evaluated number of healthcare claims is populated with selected relevant data fields including the one or more specific data fields based on the predefined file format selected from 8371, 837P, and 837D. Further, the data values of the selected relevant data fields excluding the specific data fields for each healthcare claim are populated with extracted data values associated with corresponding selected relevant data fields using a predefined criterion selected from random assignment, scenario-based, specific format or a combination thereof. In particular, the extracted data values of the selected member data fields, service provider data fields, claim data fields and charge master data fields are assigned to corresponding data fields of the healthcare claim using predefined criterion. Further, the data values for one or more specific data fields are populated based on the defined rules of step 206. In an example, the data values of selected member data fields, selected provider data fields, claim data fields and charge master data fields are randomly assigned to the corresponding data fields of each of the healthcare claims based on random assignment criterion. In an example, the data values of selected member data fields are randomly assigned to the corresponding data fields of each of the healthcare claims based on a selected age range and gender as per scenario-based criterion. Similarly, the data values of service provider data fields are randomly assigned to the corresponding data fields of each of the healthcare claims based on a selected specialty and network status as per scenario-based criterion. In another example, the data values of selected member data fields, such as member name, age etc. are assigned to the healthcare claim by matching data values of one or more member data fields, such as National Provider Identifier (NPI) with similar service provider data field based on specific format based criterion. In another example, the data values of selected service provider data fields, such as provider name are assigned to the healthcare claim by matching data values of member data fields, such as name of Primary Care Physician(PCP) with service provider data field, such as provider name based on specific format based criterion. In yet another example, the data values of selected charge master data fields may be assigned to the corresponding data fields of each of the healthcare claims based on data values of one or more claim data fields, such as procedure code and date service value as per scenario-based assignment criterion. In yet another example, the data values of selected member data field, such as Primary Care Physician may be assigned to the corresponding data fields of each of the healthcare claims based on Line of Business associated with selected operating field as per specific format based assignment criterion.

Advantageously, the method of the present invention affords a technical effect in the field of software development and testing by enabling generation of high volumes of synthetic test data records in real time. Further, the method of the present invention enables on-demand generation of versatile, scalable, and secure synthetic test data records that are agnostic to data processing applications, further leading to an improvement in the field of software development and testing. Furthermore, the method of the present invention affords significant reduction in time duration required for generation of high volumes of synthetic test data records. Yet further, the method of the present invention provides for generation of synthetic test data records having realistic data values without using confidential data, such as Protected Health Information(PHI) in case of healthcare data records. Yet further, the method of the present invention provides for generation of synthetic test data records based on various scenarios, further facilitating improved test case coverage for testing data processing applications.

Figure 3:
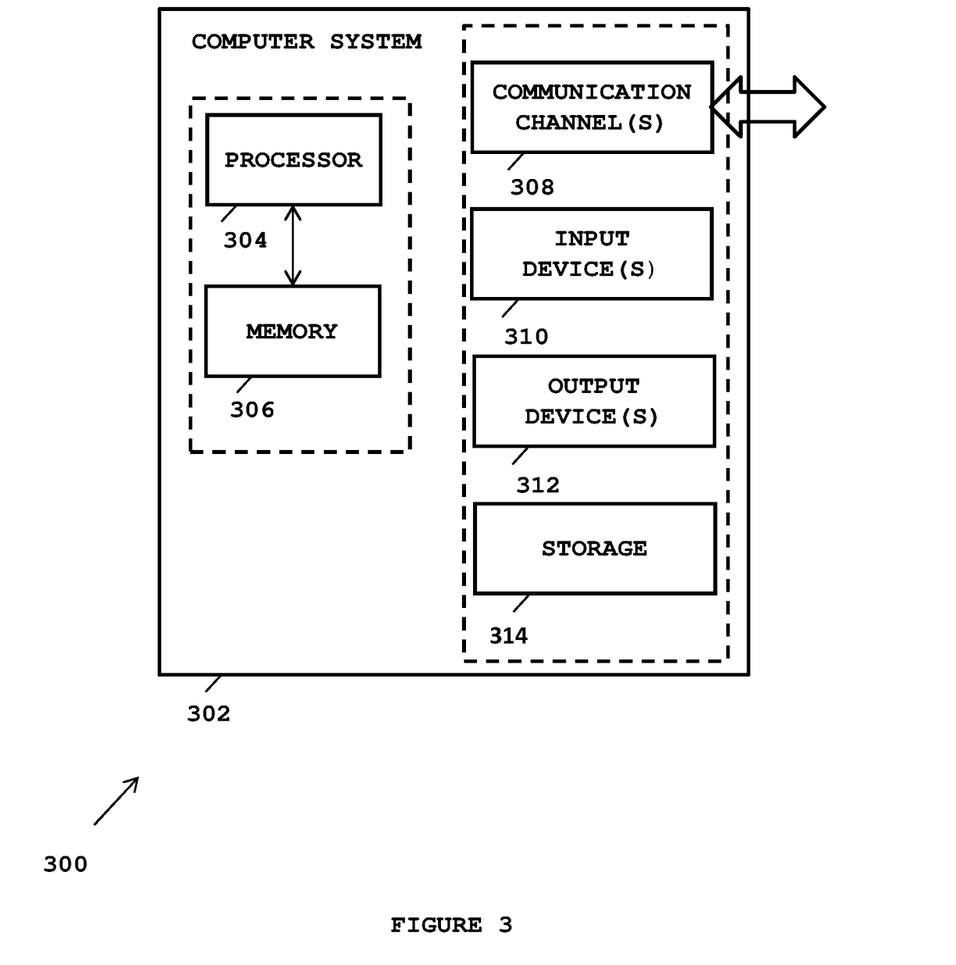
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but is not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for generating synthetic data records in a distributed computing architecture, wherein the method is implemented by at least one processor executing program instructions stored in a memory, the method comprising:
    retrieving, by at least one processor, a predefined dataset from an external resource, the predefined dataset comprising data fields specific to a selected operating field of synthetic data records, wherein the dataset is validated during retrieval including format validation, data completeness, and exclusion of special characters;
    extracting, by the at least one processor, relevant data values associated with selected relevant data fields within the validated dataset, the selection of relevant field is based on the selected operating field and user defined inputs, wherein the extracted data values are stored in a configurable format;
    defining, by the at least one processor, dynamic rules for generating synthetic data values of one or more specific data fields out of the selected relevant data fields based on an analysis of the extracted data values or user-inputs or number of combination thereof, wherein the rules are customised based on specific scenarios including handling missing data values associated with the specific data fields such that the rules ensure that the generated data conform to predefined standards;
    evaluating, by the at least one processor, a number of possible synthetic data records, wherein combinations between the extracted data values associated with two or more of the selected relevant data fields are computed, the computed combinations is the number of possible data records, and wherein the combinations between data values of two or more of the selected relevant data fields are computed by deriving a cartesian product of the highest and lowest data values associated with corresponding two or more of the selected relevant data fields; and
    generating, by the at least one processor, the evaluated number of synthetic data records based on the extracted data values and the defined rules, wherein the synthetic data records are formatted according to the predefined standards for the selected operating field and include both the extracted and newly generated data values, ensuring compatibility with existing data processing systems.

2. The method as claimed in claim 1, wherein retrieving the predefined dataset comprises:
    receiving an operating field of the synthetic data records and a type of the synthetic data records;
    identifying the predefined dataset based on the selected operating field and the type of synthetic data records using a data mapping technique or machine learning techniques; and
    validating the identified predefined dataset for preset requirements using data analytics or machine learning techniques, wherein the preset requirements include validation of dataset format, redundant dataset, relevant data fields, missing data values associated with the relevant data fields, redundant data values and special characters associated with the data values; and retrieving the identified predefined dataset from the external resource on successful validation of the preset requirements.

3. The method as claimed in claim 2, wherein the data mapping technique comprises identifying the predefined dataset from a mapping table including the selected operating field and the type of synthetic data records mapped with corresponding predefined dataset and the external resource of the predefined dataset.

4. The method as claimed in claim 2, wherein error messages are generated on unsuccessful validation of any of the preset requirements and transmitted to a user.

5. The method as claimed in claim 2, wherein the retrieved predefined dataset is represented in a configurable tabular form including the data fields and associated data values, whereby the predefined dataset can be modified or deleted, and/or one or more data fields required in the selected type of synthetic data records can be selected, modified or deleted.

6. The method as claimed in claim 2, wherein the operating field may be selected from healthcare insurance, banking, and employee management.

7. The method as claimed in claim 2, wherein the selected type of synthetic data records is healthcare claim, and the predefined dataset comprises a member dataset, a service provider dataset, a charge master dataset and a healthcare claim dataset including the data fields relevant for generation of healthcare claim.

8. The method as claimed in claim 7, wherein the service provider dataset comprises service provider data fields populated with data values, where the data values are representative of information associated with respective service provider, the service provider data fields include servicing/rendering provider first name, last name, provider type, National Provider Identifier (NPI) associated with the provider, billing details, provider address, provider city, provider specialty identifier and network status.

9. The method as claimed in claim 7, wherein the member dataset includes member data fields populated with data values, said data values are representative of information associated with respective members and dependents of the members, said member data fields include member name, relationship identifying the member as subscriber or dependent of the subscriber, subscriber ID, last name of the subscriber or the dependent, member date of birth, gender, Primary Care Physician (PCP) name, if services need to be provided by a Primary Care Physician, member address, including city, state and zip code.

10. The method as claimed in claim 7, wherein the healthcare claim dataset comprises claim data fields populated with data values, said claim data fields include claim category, claim subtype, lowest service age of a member for a service, service gender of member, procedure code, diagnosis code, and place of service.

11. The method as claimed in 7, wherein the charge master dataset includes charge master data fields populated with data values associated with charge masters of one or more service providers, said charge master data fields comprises a charge master type selected from Professional(P), Institutional(I) and Dental(D); procedure code and/or revenue code; charge amount for the procedure code; and effective date of the charge master and termination date of the charge master.

12. The method as claimed in claim 1, wherein retrieving the predefined dataset comprises:

selecting the predefined dataset from the external resource based on a source address received via user-input;

validating the selected predefined dataset for preset requirements using data analytics or machine learning techniques; and retrieving the selected predefined dataset on successful validation of the preset requirements.

13. The method as claimed in claim 1, wherein the relevant data fields are selected based on the selected operating field and a Line of Business (LOB) associated with the selected operating field.

14. The method as claimed in claim 1, wherein the one or more specific data fields are representative of one or more selected relevant data fields having no associated data values in the predefined dataset, or data values of which are dependent on the data values of other one more selected relevant fields, wherein the analysis of the extracted data values comprises identifying the one or more selected relevant data fields having no associated data values; and identifying the one or more selected relevant data fields, data values of which are dependent on the data values of the other one or more selected relevant data fields.

15. The method as claim in claim 14, wherein the defined rules comprise assigning a user-defined value or a default data value to the one or more specific data fields identified as having no associated data value; and assigning a user-defined data value or a predefined data value to the one or more specific data fields identified as having data values dependent on the other one or more selected relevant data fields based on the extracted data values of said other one or more selected relevant data fields.

16. The method as claimed in claim 1, wherein generating the evaluated number of synthetic data records based on the extracted data values and the defined rules comprises populating each of the synthetic data records with the selected relevant data fields including the one or more specific data fields based on a predefined file format, wherein the selected relevant data fields excluding the one or more specific data fields are populated with the extracted data values based on a predefined criteria and the one or more specific data fields are populated based on the defined rules.

17. The method as claimed in claim 16, wherein the predefined file format is selected based on the selected type of synthetic data records and a sub-type of the synthetic data records.

18. The method as claimed in claim 16, wherein the selected type of synthetic data records is healthcare claim and the predefined file format is selected from 837I, 837P, and 837D.

19. The method as claimed in claim 16, wherein the predefined criteria are selected from random assignment, scenario-based assignment, specific format based assignment and a combination thereof, further wherein the criterion random assignment comprises random assignment of the extracted data values associated with the selected relevant data fields to the corresponding selected relevant data fields of the respective synthetic data records;

the criterion scenario-based assignment comprises assignment of the extracted data values to the corresponding selected relevant data fields of the respective synthetic data records based on user-defined scenarios; and the criterion specific format based assignment comprises assignment of the extracted data values to the corresponding selected relevant data fields of respective synthetic data records based on pre-selected specific formats.

20. A system for generating synthetic data records in a distributed computing architecture, the system comprising:
a memory storing program instructions; at least one processor configured to execute program instructions stored in the memory; and a synthetic data production engine executed by the at least one processor, and configured to:
retrieve a predefined dataset from an external resource, the predefined dataset comprising data fields specific to a selected operating field of synthetic data records, wherein the dataset is validated during retrieval including format validation, data completeness, and exclusion of special characters;
extract relevant data values associated with selected relevant data fields from a predefined dataset including data fields within the validated dataset, the selection of relevant field is based on the operating field and user defined inputs, wherein the extracted data values are stored in a configurable format;
define dynamic rules for generating synthetic data values of one or more specific data fields out of the selected relevant data fields based on an analysis of the extracted data values or user-inputs or number of combination thereof, wherein the rules are customised based on specific scenarios including handling missing data values associated with the specific data fields such that the rules ensure that the generated data conform to predefined standards;
evaluate a number of possible synthetic data records, wherein combinations between the extracted data values associated with two or more of the selected relevant data fields are computed, the computed combinations is the number of possible data records, and wherein the combinations between data values of two or more selected relevant data fields are computed by deriving a cartesian product of the highest and lowest data values associated with corresponding two or more of the selected relevant fields; and
generate the evaluated number of synthetic data records based on the extracted data values and the defined rules, wherein the synthetic data records are formatted according to the predefined standards for the selected operating field and include both the extracted and newly generated data values, ensuring compatibility with existing data processing systems.

21. The system as claimed in claim 20, wherein the synthetic data production engine comprises a data extraction unit executed by the processor, said data extraction unit configured to retrieve the predefined dataset from a external resource by:
receiving an operating field of the synthetic data records and a type of the synthetic data records;
identifying the predefined dataset based on the selected operating field and the type of synthetic data records using a data mapping technique or machine learning techniques; and
validating the identified predefined dataset for preset requirements using data analytics or machine learning techniques, wherein the preset requirements include validation of dataset format, redundant dataset, relevant data fields, missing data values associated with the relevant data fields, redundant data values and special characters associated with the data values; and
retrieving the identified predefined dataset from the external resource on successful validation of the preset requirements.

22. The system as claimed in claim 21, wherein the data mapping technique comprises identifying the predefined dataset from a mapping table including the selected operating field and the type of synthetic data records mapped with corresponding predefined dataset and the external resource of the predefined dataset.

23. The system as claimed in claim 21, wherein the synthetic data production engine comprises an interface unit executed by the processor, the interface unit configured to represent the retrieved predefined dataset in a configurable tabular form including the data fields and associated data values, whereby said predefined dataset can be modified or deleted, and/or one or more data fields required in the selected type of synthetic data records can be selected, modified or deleted.

24. The system as claimed in claim 21, wherein the selected type of synthetic data records is healthcare claim, and the predefined dataset comprises a member dataset, a service provider dataset, a charge master dataset and a healthcare claim dataset including the data fields relevant for generation of healthcare claim.

25. The system as claimed in claim 20, wherein the synthetic data production engine comprises a data extraction unit executed by the processor, said data extraction unit configured to retrieve the predefined dataset from the external resource by:
selecting the predefined dataset from the external resource based on a source address received via user-input;
validating the selected predefined dataset for preset requirements using data analytics or machine learning techniques; and
retrieving the selected predefined dataset on successful validation of the preset requirements.

26. The system as claimed in claim 20, wherein the operating field is selected from healthcare insurance, banking, and employee management.

27. The system as claimed in claim 20, wherein the relevant data fields are selected based on the selected operating field and a Line of Business (LOB) associated with the selected operating field.

28. The system as claimed in claim 20, wherein the one or more specific data fields are representative of one or more selected relevant data fields having no associated data values in the predefined dataset, or data values of which are dependent on the data values of other one more selected relevant fields, wherein the analysis of the extracted data values comprises identifying the one or more selected relevant data fields having no associated data values; and identifying the one or more selected relevant data fields, data values of which are dependent on the data values of the other one or more selected relevant data fields.

29. The system as claimed in claim 20, wherein generating the evaluated number of synthetic data records based on the extracted data values and the defined rules comprises populating each of the synthetic data records with the selected relevant data fields including the one or more specific data fields based on a predefined file format, wherein the selected relevant data fields excluding the one or more specific data fields are populated with the extracted data values based on a predefined criteria and the one or more specific data fields are populated based on the defined rules.

30. The system as claimed in claim 29, wherein the predefined file format is selected based on the selected type of synthetic data records and a sub-type of the synthetic data records.

31. The system as claimed in claim 29, wherein the selected type of synthetic data records is healthcare claim and the predefined file format is selected from 837I, 837P, and 837D.

32. The system as claimed in claim 29, wherein the predefined criteria are selected from random assignment, scenario-based assignment, specific format based assignment and a combination thereof.

33. A computer program product comprising:
a non-transitory computer-readable medium having computer-readable program code stored thereon, the computer-readable program code comprising instructions that, when executed by a processor, cause the processor to:
retrieve a predefined dataset from an external resource, the predefined dataset comprising data fields specific to a selected operating field of synthetic data records, wherein the dataset is validated during retrieval including format validation, data completeness, and exclusion of special characters;
extract relevant data values associated with selected relevant data fields within the validated dataset, the selection of relevant field is based on the operating field and user defined inputs, wherein the extracted data values are stored in a configurable format;
define dynamic rules for generating synthetic data values of one or more specific data fields out of the selected relevant data fields based on an analysis of the extracted data values or user-inputs or number of combination thereof, wherein the rules are customised based on specific scenarios including handling missing data values associated with the specific data fields such that the rules ensure that the generated data conform to predefined standards;
evaluate a number of possible synthetic data records, wherein combinations between the extracted data values associated with two or more of the selected relevant data fields are computed, the computed combinations is the number of possible data records, and wherein the combinations between data values of two or more selected relevant data fields are computed by deriving a cartesian product of the highest and lowest data values associated with corresponding two or more of the selected relevant fields; and
generate the evaluated number of synthetic data records based on the extracted data values and the defined rules, wherein the synthetic data records are formatted according to the predefined standards for the selected operating field and include both the extracted and newly generated data values, ensuring compatibility with existing data processing systems.

* * * * *